Feb. 24, 1970    D. S. OLIVER    3,497,700
METHOD OF ANALYZING VIBRATIONS OF A VIBRATING OBJECT
Filed Nov. 19, 1965
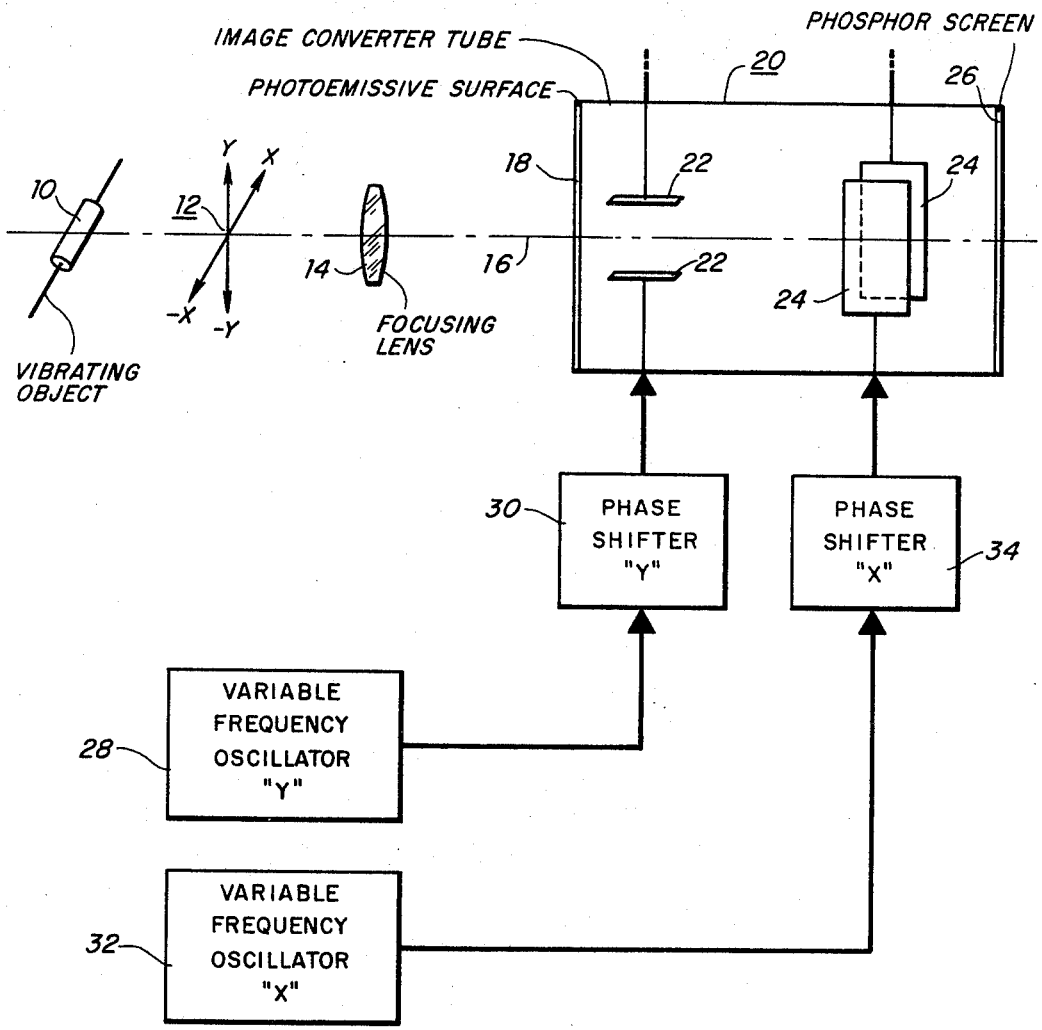
DONALD S. OLIVER
INVENTOR.
BY Stanley Belsky
Robert L. Nathans
ATTORNEY United States Patent Office 3,497,700
Patented Feb. 24, 1970

3,497,700
METHOD OF ANALYZING VIBRATIONS OF A VIBRATING OBJECT
Donald S. Oliver, West Acton, Mass., assignor to Itek Corporation, Lexington, Mass., a corporation of Delaware
Filed Nov. 19, 1965, Ser. No. 508,664
Int. Cl. H01j *39/12*
U.S. Cl. 250—215         2 Claims

ABSTRACT OF THE DISCLOSURE

A method for analyzing the vibrational characteristics of a cyclically vibrating object is disclosed. A deflectable energy stream which may comprise electron streams in an image converter is manipulated until the visible image produced on the readout screen of the converter is substantially zero in at least one particular mode.

---

This invention relates to improvements in methods of vibration analysis, and in particular to a method for analyzing the characteristic frequency, amplitude, or phase of a vibrating object.

Stroboscopes have been long utilized to examine the frequencies of vibrating bodies. However, for certain applications, such as eye examinations, a flashing strobe light cannot be used. Furthermore, stroboscopes do not measure directly the amplitude of vibration of a moving object.

There are many applications in industry where it is important to measure the frequency, amplitude, or phase of various vibrating components of an apparatus. While it may be difficult or impossible to stop vibrations of the apparatus, it is within engineering and design capability to stop or materially dampen the vibration of the component part. By so doing, apparatus malfunction or breakdown is prevented. For example, in the aerospace industry it is known that a space capsule is subject to great vibrating forces, especially during launch, and an improperly mounted circuit board of an electronic apparatus used in the space capsule can render the electronic apparatus inoperative with possible dire consequences. To prevent malfunction, industry provides test facilities where the apparatus is subject to artifically created environmental conditions. In the example above, the electronic apparatus is mounted on a shaker table and the electronic apparatus subjected to vibration of combinations of frequencies, amplitudes, or phase relationships as will be experienced during launch. The individual components, because of their mass and mounting, will also vibrate sympathetically with the electronic apparatus. If the mounting is inadequate, the component will vibrate at frequencies, amplitudes, or phases different from those of the apparatus, which can lead to component breakdown and apparatus malfunction. Knowledge of these vibrations is utilized to reduce the vibrations by altering the mountings.

There are measuring devices known wherein a spot of light that is generated by a cathode ray tube follows the edge of a vibrating component part by utilizing a feedback circuit for controlling the voltages on the deflection system of the cathode ray tube. The voltages applied to the deflection plates are measured to determine the amplitude and frequency of vibration. However, such measuring devices do not permit optical stabilization or "freezing" of the particular part whose vibrational characteristics are simultaneously being measured, which stabilization optically assures the operator he is measuring a particular desired part and not some undesirable part. In accordance with the present invention an image converter tube is utilized to simultaneously provide the aforesaid stabilization and measurement of the vibrating component part. For example, an object vibrating in a sine mode will cause the electron stream of the image converter tube, without deflection forces being applied to the deflection plates of the image converter tube, to fluctuate sinusoidally in a manner corresponding to the mode of vibration of the object. A sinusoidal "bucking" signal is found, which is applied to the deflection plates of the image converter tube, having a frequency corresponding approximately to the frequency and amplitude of the vibrating object and having a phase relationship to prevent the sinusoidal fluctuation of the electron stream which would otherwise occur.

It is, therefore, an object of the present invention to provide a new and improved method for analyzing the vibrational characteristics of a vibrating object.

A further object of the present invention is to provide an improved method of vibration analysis for analyzing the vibrational characteristics of a vibrating object and for simultaneously effecting optical stabilization of the vibrating object to prevent confusion as to which vibrating component of a system is being analyzed.

Another object of the present invention is to provide a new and improved method of vibration analysis that requires no bright flashing light source.

Other objects and advantages of the present invention will become readily apparent to those well skilled in the art with the following description with reference to the sole accompanying figure wherein there is a schematic showing a preferred method of analyzing vibrations of a vibrating object.

In accordance with the present invention, there is provided a method for analyzing the characteristics of an object cyclically vibrating in at least one particular mode. The method is comprised of the steps of producing a deflectable energy stream, having a configuration corresponding to the vibrating optical image of the vibrating object and manifesting a visible image corresponding to the configuration. The energy stream, which may comprise electron streams generated in an image converter, is manipulated until the visible image produced on the readout screen of the converter is substantially motionless in the one particular mode. Indications are produced of the manipulation required to render the visible image substantially motionless in the one particular mode. More specifically, cyclically varying deflection forces are applied to the electron stream exactly 180 degrees out of phase with the motion of the electron stream. The amplitude and waveshape of these forces are properly adjusted until the aforesaid stabilization in the particular mode is obtained. Since the frequency amplitude and phase characteristics of the deflection forces are known, and since they correspond to the characteristics of the vibrating part being viewed, measurement of these characteristics is effected along with stabilization. By providing an additional set of orthogonal deflection forces, two dimensional analysis is effected.

In the figures there is shown a schematic of a system for practicing the method of the present invention. An object 10 is shown in the figure, for purposes of explanation only, as a resistor and as a component of an electronic apparatus, which in turn is mounted on a shaker table which is not shown. Object 10 vibrates in a manner which can be resolved into vibrations along the $x$ and $y$ axes, indicated at 12.

A focusing lens 14 in addition to establishing a reference axis 16 produces and focuses an optical image of object 10 on photoemissive surface 18 of an evacuated image converter tube 20. Since the operation of the image converter tube is well known, suffice it to say that light energy striking the photoemissive surface is converted to an electron stream which is accelerated by an internal electric field. Focusing means associated with the image converter tube focuses the electron stream to provide an electron stream image at the output face of the tube. The inner surface of the output face of the tube is coated with fluorescent material which fluoresces in response to the impingement of the electrons thereon to produce a visible image. An internal electric field is established by pairs of deflection plates. One pair of deflection plates 22 is capable of deflecting the electron stream along the $x$ direction and another pair of deflection plates is capable of deflecting the electron stream along the $y$ direction. The electron stream impinges on phosphor screen 6 at the output face of tube 20 to produce a visible image that manifests the characteristics of the electron stream.

It will be observed that the optical image at photoemissive surface 18 has frequency, amplitude, or phase characteristics corresponding to the characteristics of vibrating object 10. Further, it will be observed that the electron beam in the absence of deflection forces has the frequency, amplitude, or phase characteristics of the optical image. Also, the electron stream has an electron distribution corresponding to the configuration of the optical image.

The electron stream is manipulated until the visible image is substantially motionless. The manipulation is performed by applying a first set of cyclically varying electron stream deflected forces to the electron stream in a first direction corresponding to one dimension of the space field until the motion of the image on output screen 6 in the first direction is reduced to substantially zero. Thus, a variable frequency oscillator 28 is provided for producing the cyclically varying electrostatic "bucking" forces of the appropriate frequency and amplitude to render the electron stream motionless in this dimension. A phase shifter 30 is coupled between variable frequency oscillator 28 and deflection plates 22 to adjust the phase of the "bucking" forces until they are one hundred and eighty degrees out of phase with the motion of the electron stream which would occur in the absence of these forces. The amplitudes, frequency, and phase settings which effect stabilization indicate the vibrational characteristics in this directional mode.

The electron stream is further manipulated in like manner until the visible image is substantially motionless in the $x$ direction. The further manipulation is performed by applying a second set of cyclically varying electron stream deflection forces orthogonal to the first set to the electron stream in a second direction corresponding to another dimension of the space field. Again, deflection plates 24, variable frequency oscillator 32, and phase shifter 34 provided for this purpose.

While the vibrating object will generally be visible to the human eye, the term "optical" as used herein includes infrared and ultraviolet images. It is also contemplated that the energy stream may comprise light and that the stream may be deflected by an oscillating optical element such as a lens. However, the manipulation of the inertialess electron image is preferred.

While there has been presented what are at present considered the preferred steps of performing the method of the invention, it will be apparent to those of ordinary skill in the art that many and various changes and modifications may be made with respect to the method described and illustrated without departing from the spirit of the invention. It will be understood, therefore, that all changes and modifications as fall fairly within the scope of the present invention, as defined in the appended claims, are to be described as a part of the present invention.

What is claimed is:

1. A method for measuring the unknown frequency of at least a portion of an input image periodically vibrating back and forth in at least one particular mode comprising the steps of:
    (a) producing an electron stream having periodic vibrational characteristics corresponding to the vibrational characteristics of said input image periodically vibrating back and forth and having an electron distribution configuration corresponding to the configuration of said periodically vibrating optical image;
    (b) manifesting a periodically vibrating output image corresponding to the characteristics of said electron stream;
    (c) sequentially applying periodically varying electron stream deflection forces having different frequencies to said electron stream until a portion of said output image is substantially motionless in said particular mode; and
    (d) producing an indication of that particular frequency of said periodically varying deflection forces which renders said portion of said output image substantially motionless, thereby to measure the frequency of oscillation of said input image.

2. The combination as set forth in claim 1 wherein deflection forces orthogonal to said first mentioned deflection forces are applied to said electron stream until a portion of said output image is substantially motionless thereby to measure both orthogonal, vibrational components of said input image.

References Cited

UNITED STATES PATENTS

| | | | |
|---|---|---|---|
| 2,625,659 | 1/1953 | Mendelson | 250—232 X |
| 2,667,585 | 1/1954 | Gradstein | 250—213 |
| 2,967,247 | 1/1961 | Turck | 250—203 |
| 3,149,235 | 9/1964 | Clark | 250—203 |
| 3,271,740 | 9/1966 | Rabinow | 250—213 X |

WALTER STOLWEIN, Primary Examiner

U.S. Cl. X.R.

88—14